United States Patent [19]

Dumesnil et al.

[11] Patent Number: 4,743,302

[45] Date of Patent: May 10, 1988

[54] LOW MELTING GLASS COMPOSITION

[75] Inventors: Maurice E. Dumesnil, Los Altos Hills; Leo Finkelstein, San Francisco, both of Calif.

[73] Assignee: VLSI Packaging Materials, Inc., Los Altos Hills, Calif.

[21] Appl. No.: 5,040

[22] Filed: Jan. 20, 1987

Related U.S. Application Data

[63] Continuation-in-part of Ser. No. 871,503, Jun. 6, 1986, abandoned, which is a continuation-in-part of Ser. No. 830,853, Feb. 19, 1986, abandoned.

[51] Int. Cl.$^4$ ............... C03C 3/12; C03C 3/21; C03C 14/00; C03C 8/24
[52] U.S. Cl. ............... 106/1.23; 428/426; 428/432; 428/433; 428/434; 501/15; 501/17; 501/32; 501/41; 501/44; 501/46
[58] Field of Search ............... 501/15, 17, 41, 46, 501/32, 44; 428/426, 432, 433, 434; 106/1.23

[56] References Cited

U.S. PATENT DOCUMENTS

| | | | |
|---|---|---|---|
| 3,408,212 | 6/1965 | Dumesnil | 501/43 |
| 3,454,408 | 7/1969 | Busdiecker | 501/15 |
| 3,650,778 | 3/1972 | Dumesnil et al. | 501/43 |
| 3,837,866 | 9/1974 | Malmandier et al. | 501/41 |
| 4,186,023 | 1/1980 | Dumesnil et al. | 501/15 |

FOREIGN PATENT DOCUMENTS 1552648 9/1979 United Kingdom .

Primary Examiner—Mark L. Bell
Attorney, Agent, or Firm—Ciotti & Murashige, Irell & Manella

[57] ABSTRACT

Fluid, stable glasses that are useful for low temperature sealing applications are made by adding jointly bismuth oxide, zinc oxide, and phosphorus pentoxide to the lead oxide-vanadium oxide binary. The phosphorous pentoxide may be replaced partially or entirely with niobium pentoxide and/or tantalum pentoxide. Additives and fillers may be incorporated into the glass composition to enhance the fluidity or adhesive characteristics of the glass, alter its coefficient of linear thermal expansion or make it suitable for die attach application. Group V metal oxides, particularly niobium pentoxide, are preferred fillers for altering the coefficient of linear thermal expansion. Similarly these Group V metal oxides may also be added as particulate fillers to lead borate, lead borosilicate and zinc borate glasses. Silver metal is a preferred filler for making die attach compositions.

46 Claims, No Drawings

LOW MELTING GLASS COMPOSITION

CROSS-REFERENCE TO RELATED APPLICATION

This application is a continuation-in-part of copending U.S. patent application Ser. No. 871,503 filed June 6, 1986, now abandoned, which in turn is a continuation-in-part of copending U.S. patent application Ser. No. 830,853, filed Feb. 19, 1986, now abandoned.

DESCRIPTION

1. Technical Field

This invention relates to novel low temperature sealing glasses. It is particularly concerned with very low melting glasses with or without added ceramic fillers capable of hermetically sealing electronic ceramic parts such as alumina and beryllia in the 300° C. range.

2. Background Art

This invention addresses the problem of sealing with a glass certain types of semiconductor devices which do not tolerate a sealing cycle above about 300° C. such as gallium arsenide, many of the other Group III-V compounds (i.e., compounds composed of an element from Group III and an element of Group V of the periodic table) and hybrid circuits.

It is well known in the art that commercially available solder glasses capable of sealing ceramic and glass component parts such as television tubes and semiconductor ceramic packages are practical in the 420° to 500° C. temperature range. These solder glasses are derived from the lead-boron oxide binary which in combination with silica and alumina produces a wide glass forming region.

The lead oxide-boron oxide eutectic contains by weight 13% boron oxide and 87% lead oxide and represents the most fluid glass in that binary. It is the starting point from which most commercial solder glasses are derived. The addition of certain specific metal oxides in the glass melt such as silica, alumina, tin and barium oxide renders the resulting glass more complex, more stable and more resistant to chemicals and hot water.

Lead borate glasses, with the addition of particulate low expansion ceramic fillers to adjust the overall linear thermal expansion of the sealing glass, have been highly successful during the past two decades in fulfilling the mechanical strength and hermeticity requirements of the semiconductor packaging industry. There exists, however, with lead borate and lead borosilicate glasses a natural lower temperature limitation which precludes any sealing below 400°-420° C.

With the advent of certain types of advanced semiconductor devices (such as gallium arsenide) and related Group III-V compound multilayer semiconductor devices (such as laser diodes), there exists an urgent need for a practical sealing glass which can be processed at 300° C. or less and capable of meeting the more demanding US Military Specifications (MIL-SPECS 883).

Although various attempts have been made in the past to develop low temperature sealing glasses practical for seals at 300° C. or lower, these attempts have been seriously limited by the paucity of potential material selection. Specifically what is looked for is a unique combination of the following physical characteristics: a metal oxide mixture in the form of a true solution with a low melting point, glass formation (supercooled liquid), low viscosity in the liquid phase, and glass phase stability accompanied with low linear thermal expansion.

One potential candidate is the lead-vanadium oxide binary which forms a eutectic at a lower temperature than the lead-boron oxide eutectic. It tends to form a glass during rapid quenching, but recrystallizes too rapidly on reheating to have any practical application.

Dumesnil et al in U.S. Pat. No. 3,408,212 describe the effect of adding large quantities of lead fluoride to lead-vanadium oxide mixtures. A narrow glass forming region was found to exist in the center of the $PbO$-$PbF_2$-$V_2O_5$ ternary diagram with improved glass life stability. These soft glasses are characterized by very high linear thermal expansion (135 to $155 \times 10^{-7}$/°C.) but are not sufficiently stable in the glass form to be considered as practical glass sealants.

Malmendier and Sojka (U.S. Pat. No. 3,837,866) describe the addition of $As_2O_3$ and $As_2O_5$ to both $PbO$-$V_2O_5$ and $Cs_2O$-$V_2O_5$ eutectics to prevent early recrystallization and to braoden the compositional area within which stable glasses can be produced. The addition of arsenic oxide tends, however, to increase rapidly the viscosity of the resulting glasses thus preventing the availability of a fluid, stable solder glass at 300° C. or less.

In U.S. Pat. No. 3,650,778 Dumesnil et al describe lead-free glass compositions containing 10% to 60% by weight ZnO, 13% to 60% $V_2O_5$, 7.5% to 13% $B_2O_3$ and 10% to 25% $P_2O_5$.

British Pat. No. 1,552,648 describes a blend of $PbO$-$V_2O_5$-$P_2O_5$ glass mixed with up to 50% zirconium phosphate ($ZrO_2.P_2O_5$) powder.

Busdiecker (U.S. Pat. No. 3,454,408) describes the addition of BaO and ZnO to lead vanadate to produce a high expansion, low temperature solder glass. He does not describe the addition of $Bi_2O_3$ which is a necessary and required component in the present invention. Nor does this patent mention $Nb_2O_5$ or $Ta_2O_5$, both of which are highly desirable components of the sealing glass of the present invention.

DISCLOSURE OF THE INVENTION

The present invention is based on the discovery that very fluid stable glasses can be prepared by the joint addition of (i) bismuth oxide; (ii) zinc, barium, or strontium oxide; and (iii) phosphorus, niobium, or tantalum oxide to the lead-vanadium oxide binary. These three oxides when added together to lead and vanadium oxides produce a broad, fluid and stable glass forming area which makes the resulting five component glass very practical for low temperature sealing applications.

The novel low melting glass composition of this invention comprises, in weight percent calculated on an oxide basis:

(a) PbO: 30% to 55%,
(b) $V_2O_5$: 30% to 55%,
(c) $Bi_2O_3$: 0.1% to 18%,
(d) $P_2O_5$, $Nb_2O_5$, $Ta_2O_5$ or combinations thereof: 0.1% to 10%,
(e) ZnO, BaO, SrO, or combinations thereof: 0.1% to 10% wherein the combined weight percent of (c)+(d)+(e) is in the range of 0.3% and 20%, and with the proviso that (a) may be replaced partially up to 25% by weight with cesium oxide.

This novel glass composition has a sealing temperature at about 300° C., requires a short sealing time, has excellent thermal shock resistance and high chemical resistance in an environment of combined high temperature and elevated humidity (85° C./85% relative humidity).

Preferred glass compositions of this invention consist essentially of in weight percent calculated on an oxide basis:
(a) PbO: 35% to 45%
(b) $V_2O_5$: 35% to 45%
(c) $Bi_2O_3$: 3% to 8%
(d) ZnO: 2% to 7%
(e) $P_2O_5$: 0% to 5%
(f) $Nb_2O_5$: 0% to 5%
(g) $Ta_2O_5$: 0% to 8% .
wherein the combined weight percent of (e)+(f)+(g) is in the range of 0.1 to 10%.

Mixtures of the above-described novel glass compositions with about 1% to about 50% by weight, based on the mixture, of a low thermal expansion ceramic particulate filler, preferably a Group V metal oxide, are another aspect of the invention.

Mixtures of the above-described novel glass compositions or glass composition-filler mixtures with up to 90% by weight, based on the total mixture of silver or gold powder, are another aspect of the invention.

Solder glasses mixed with about 1% to about 50% by weight of a Group V metal oxide filler are yet another aspect of the invention.

MODES OF CARRYING OUT THE INVENTION

Depending upon the particular sealing application for which the glass is intended, additives or fillers may be combined with the five basic components of the glass. Examples of such additives are copper oxide, silver oxide, and fluorine, which are typically incorporated into the glass composition in amounts up to 3% by weight, and $WO_3$ and $MoO_3$, which are typically incorporated into the glass composition in amounts up to 5% by weight.

The addition of such amounts of copper oxide to the glass composition improves the adhesion of the glass to metal surfaces such as gold. Silver oxide may be added to improve the fluidity of the glass, if desired. The addition of fluorine to the composition increases the linear thermal expansion of the resulting glass, thereby rendering the composition suitable for use in sealing high coefficient of thermal expansion metals (thermal expansion $>115\times10^{-7}$/°C.) such as soft steels, copper, copper alloys, aluminum, and aluminum alloys. To compensate for increasing glass instability due to the presence of fluorine, the amount of bismuth oxide and/or niobium pentoxide may be increased.

Particulate ceramic filler may be added to the glass powder of the invention as a means of controlling the overall thermal expansion and contraction of the resulting sealing glass mixture. Increased amounts of a low thermal expansion ceramic filler will correspondingly decrease the linear expansion of the sealing glass, the decrease being practically a linear function of the glass/filler volume ratio. Such fillers are commonly used to make glass suitable for sealing lower expansion ceramics, glasses or metals. Close matching of thermal expansion of the sealing glass to the ceramic parts (e.g. alumina, beryllia or steatite parts) to be joined is critical to maintain zero stress in the seal joint. This insures strength and hermeticity under extreme conditions of thermal cycling and thermal shock. It is also known that the presence in a glass of a crystalline second phase is beneficial in strengthening a glass seal. The addition of a particulate filler minimizes crack propagation throughout the glass.

While ceramic fillers such as the conventional refractory silicates (e.g., beta-eucryptite, zirconium silicate, willemite, cordierite) and titanates (e.g., lead titanate) used with lead solder glasses may be used, the low temperature sealing glasses of the present invention do not wet the surfaces of such fillers well. If has been found, however, that refractory fillers made from Group V metal (P, As, Sb, V, Nb, Ta) oxides are entirely compatible with the glasses of the invention, exhibit superior wetting relative to the conventional fillers, and provide excellent hermetic seals. These new Group V metal fillers are also useful with solder glasses other than those of this invention. Table 1 below lists examples of this new class of refractory fillers, together with linear thermal expansion values, where known.

TABLE 1

| | *Linear Expansion | | *Linear Expansion |
|---|---|---|---|
| PHOSPHATES | | NIOBATES | |
| $Al_2O_3 \cdot P_2O_5$ | 5 | $Nb_2O_5$ | −5 |
| $ZrO_2 \cdot P_2O_5$ | | $Al_2O_3 \cdot Nb_2O_5$ | 26.5 |
| $SiO_2 \cdot Al_2O_3 \cdot P_2O_5$ | | $PbO \cdot Nb_2O_5$ | 13 |
| $SiO_2 \cdot B_2O_3 \cdot Al_2O_3 \cdot P_2O_5$ | | $2PbO \cdot Nb_2O_5$ | 26 |
| | | $MgO \cdot Nb_2O_5$ | 50 |
| ARSENATES | | | |
| $PbO \cdot As_2O_5$ | | $ZnO \cdot Al_2O_3 \cdot Nb_2O_5$ | |
| $PbO \cdot TiO_2 \cdot 0.1 As_2O_5$ | | $SiO_2 \cdot Al_2O_3 \cdot Nb_2O_5$ | |
| | | $PbO \cdot TiO_2 \cdot Nb_2O_5$ | 0 |
| | | $PbO \cdot Bi_2O_3 \cdot TiO_2 \cdot Nb_2O_5$ | −15 |
| ANTIMONATES | | | |
| $PbO \cdot Sb_2O_5$ | | $3PbO \cdot MgO \cdot Nb_2O_5$ | 25 |
| $PbO \cdot TiO_2 \cdot 0.1 Sb_2O_5$ | | $PbO \cdot TiO_2 \cdot 0.1 Nb_2O_5$ | −40 |
| VANADATES | | TANTALATES | |
| $ZnO \cdot SiO_2 \cdot V_2O_5$ | | $Ta_2O_5$ | 20 |
| $ZnO \cdot Ta_2O_5 \cdot V_2O_5$ | | $ZnO \cdot Nb_2O_5 \cdot Ta_2O_5$ | |
| $ZnO \cdot Nb_2O_5 \cdot V_2O_5$ | | $ZnO \cdot Al_2O_3 \cdot Ta_2O_5$ | |
| $ZrO_2 \cdot Ta_2O_5 \cdot V_2O_5$ | | $SiO_2 \cdot Al_2O_3 \cdot Ta_2O_5$ | |
| $23Nb_2O_5 \cdot 2V_2O_5$ | 0 | $3PbO \cdot 4Ta_2O_5$ | 65 |
| $9Nb_2O_5 \cdot V_2O_5$ | 0 | $PbO \cdot 2Ta_2O_5$ | 40 |

As exemplified in Table 1, the terms "Group V metal oxide" denotes compounds comprised of a Group V metal and oxygen, with or without the inclusion of other metals. Of this new class of fillers, niobium pentoxide is preferred (linear thermal expansion approx. zero). It is available commercially with very low levels of radioactivity (alpha emission <0.1 count per hr per $cm^2$) which makes it highly desirable for packaging radiation sensitive semiconductor devices such as silicon memory chips. Other niobium-containing oxides such as lead titanium niobate and lead bismuth titanium niobate are also excellent fillers.

The fillers, whether of the conventional type or the new Group V oxide type, are typically mixed with the glass composition in amounts in the range of 1% to 50% by weight based on the mixture. The mixtures are prepared by introducing the glass flakes and refractory powder into a ball mill and milling in a conventional manner to reduce the bulk components to finely divided particles that are mixed uniformly.

The resulting glass refractory mixtures may be applied to the work piece as such or they may be mixed with an organic vehicle to form a paste which is used to coat the work piece which is thereafter heated to melt the glass and produce the seal coating. The organic vehicles are synthetic solvents boiling preferably in the range of 150° C. to 220° C. such as butyl carbitol, carbitol acetate or similar solvents.

A metal powder filler such as silver or gold may be mixed with the glass powder of the invention in amounts up to 90% by weight, usually 70% to 80%, based on the mixture, for die attach applications in semiconductor chip packaging. The metal-glass mixture may be formed into a paste by formulation with organic vehicles such as those described above for application to the die. A refractory filler such as those described above may be added to the metal-glass mix to control the stress in the bonding interface between an electronic component and its metal, glass, or ceramic substrate.

It has also been found that lead oxide in the glass composition may be replaced partially up to 25% by weight with cesium oxide. Such replacement may be made to make the glass more fluid.

Although a prime objective in the use of these glasses and glass-filler mixtures of this invention is a low sealing glass temperature in the 300° C. range, it should be understood that there may be special applications requiring a higher temperature. Thus no upper limit in temperature is inherent in the application of the glass materials of this invention.

It will be readily understood by those of skill in the glass making art that cupric oxide, cuprous oxide, litharge ($Pb_3O_4$), lead dioxide ($PbO_2$), or any chemical precursors to the oxides of the compositions described in this application can be used to formulate the glasses. Thus, phosphorus pentoxide can also be introduced in the glass batch in a nonvolatile form such as lead phosphate, bismuth phosphate or zinc phosphate. Similarly fluorine can be introduced in the glass batch as zinc fluoride or lead fluoride.

Optionally other common glass additives may be added in the vitreous glass formulation in an amount lower than 5% total weight. These are: $TiO_2$, $SnO_2$, $CdO$, $TeO_2$, $As_2O_3$, $B_2O_3$, $Sb_2O_3$, $FeO$ and other transitional metal oxides, cerium oxide and other rare earth oxides.

The sealing glasses of the invention are coated onto metal, glass, or ceramic parts at thicknesses in the range of about 100 to 700 microns. These metal, glass, or ceramic parts are usually produced in the form of square or rectangular bodies in sizes ranging from about 6 to 25 mm per side and 200 to 2500 microns thick, flat or with a recess. The sealing-glass pattern (coating) over the entire surface or around the edges is formed by printing and glazing. These parts can be sealed at low temperature on ceramic electronic packages known commercially as side-brazed packages, chip carriers, and pin grid arrays as well as metal packages.

The following examples describe the preparation and composition of the sealing glasses of the invention. These examples are not intended to limit the invention in any manner.

EXAMPLE 1

A base glass was prepared by mixing 250 grams of lead oxide, 250 grams vanadium pentoxide, 24 grams of zinc oxide, 61.5 grams of ammonium phosphate and 30 grams of bismuth trioxide. After heating the mixture in a ceramic crucible at 700° C. for 20 minutes the melt was poured through cold steel rollers to facilitate subsequent crushing. The resulting glass flakes had a composition in weight percent as follows:
PbO: 43.5%
$V_2O_5$: 43.5%
ZnO: 4.2%
$P_2O_5$: 3.6%
$Bi_2O_3$: 5.2%
This glass has a linear thermal expansion (25° C.–200° C.) = $106 \times 10^{-7}$/°C. and a DTA (Differential Thermal Analysis) softening point of 225° C. This glass forms a chemical bond to alumina at 280° C. as seen under a high power microscope (400X).

EXAMPLE 2

A base glass was prepared by mixing 250 grams of lead oxide, 250 grams of vanadium oxide, 24 grams of zinc oxide, 61.5 grams of ammonium phosphate, 30 grams of bismuth oxide and 2 grams of cuprous oxide. After heating the mixture in a ceramic crucible at 700° C. for a few minutes, the melt was poured through cold steel rollers to form glass flakes to facilitate subsequent crushing. The resulting glass flakes has a composition in weight percent as follows:
PbO: 43.3%
$V_2O_5$: 43.3%
ZnO: 4.2%
$P_2O_5$: 3.7%
$Bi_2O_3$: 5.2%
$Cu_2O$: 0.35%
This glass has a linear thermal expansion (25° C.–200° C.) = $102 \times 10^{-7}$/°C. and a DTA softening point of 220° C.

Additional examples of the sealing glasses of the invention were prepared following the procedure described in Examples 1 and 2. These additional examples (designated D, E, F, G and H) are reported in Table 2 below together with comparison glass compositions (designated A, B, and C) that lack one or more of the five essential components of the invention glass.

TABLE 2

| Component | (Examples in weight percent) | | | | | | | |
|---|---|---|---|---|---|---|---|---|
| | A | B | C | D | E | F | G | H |
| PbO | 54 | 47 | 47 | 45.5 | 45.5 | 45.5 | 45.5 | 45.5 |
| $V_2O_5$ | 46 | 47 | 47 | 45.5 | 45.5 | 45.5 | 45.5 | 45.5 |
| $Bi_2O_3$ | — | — | 3 | 3 | 3 | 3 | 3 | 3 |
| ZnO | — | 3 | 3 | 3 | 3 | 3 | 3 | 3 |
| $P_2O_5$ | — | 3 | — | 3 | 1 | — | — | 1 |
| $Nb_2O_5$ | | | | | 2 | 3 | — | 1 |
| $Ta_2O_5$ | | | | | | | 3 | 1 |
| | U | U | U | S | S | S | S | S |

S = stable
U = unstable

In Table 2, Example A represents the lowest melting combination of lead oxide and vanadium oxide (binary eutectic). This material in the form of a homogeneous melt when quickly quenched from 700° C. to room temperature forms an unstable glass. On reheating above its softening point it rapidly recrystallizes which makes this material impractical as a sealing glass. Glasses B and C, which lack, respectively, bismuth oxide and phosphorus/niobium/tantalum oxide, were likewise unstable. The increasing addition of zinc, phosphorus and bismuth oxides to the initial lead and vanadium oxide melt renders the resulting glass increasingly more stable to the point that glasses D, E, F, G and H will remain glassy and very fluid for a long period of time when held at about 320° C.

Glass stability (or glass lifetime) in the above table is defined as the ability of a glass composition to retain its desirable amorphous and fluid phase at or slightly above its softening point. In Examples D, E, F, G and H the glasses remain fluid at 300° C. for a minimum time of 10 minutes. In contrast glass A recrystallizes almost instantaneously within a few seconds. It is clear that the joint addition of ZnO, $Bi_2O_3$ and $P_2O_5$ produces the minimum glass lifetime required in a practical sealing glass. Similarly as seen from examples E, F, G and H the phosphorous pentoxide may be partially or totally replaced with niobium pentoxide or tantalum pentoxide.

Further examples (designated I–N) of stable glasses are listed in Table 3 below. It can be seen from Table 3 that stable, soft glasses eminently suitable for sealing applications can be made by the joint addition of bismuth oxide, zinc oxide and phosphorus/niobium/tantalum pentoxide to a mixture of lead oxide and vanadium oxide.

TABLE 3

| Component | (Examples in weight percent) | | | | | |
|---|---|---|---|---|---|---|
| | I | J | K | L | M | N |
| PbO | 40 | 40 | 41 | 35 | 35 | 40 |
| $V_2O_5$ | 44 | 40 | 41 | 44 | 44 | 40 |
| $Bi_2O_3$ | 10 | 10 | 10 | 4 | 3 | 3 |
| ZnO | 3 | 5 | 5 | 3 | 3 | 3 |
| $P_2O_5$ | 3 | 5 | | | | 3 |
| $Nb_2O_5$ | | | 3 | 3 | | 3 |
| $Ta_2O_5$ | | | | | 5 | |
| $PbF_2$ | | | | 10 | 10 | 8 |
| $Cu_2O$ | | | | 1 | | |
| DTA Soft. Pt (°C.) | 230 | 235 | 236 | 220 | 220 | 230 |
| Thermal Expansion* | 110 | 115 | 110 | 140 | 140 | 136 |

*$10^{-7}$/°C.

EXAMPLE 3

The glass flakes prepared according to Example L, Table 3, were ground in a ball mill and the resulting powder screened through a 150 mesh screen. The fine glass powder was mixed with 20% by weight, based on the mixture, of zirconium silicate powder and formed into a paste with 10% by weight butyl carbitol solvent. The resulting paste was screen printed on preoxidized copper alloy parts (copper alloy containing a small amount of silicon), dried and heated to melt the sealing glass material. The thickness of the fused glass layer was of the order of 200 microns.

The glazed parts were inverted and held in position by the pressure exerted by a metal clip on another copper alloy microelectronic package. The structure was heated at a rate of 75° C. per minute to a peak of 320° C. for 5 minutes then cooled to room temperature to produce a tight, strong vitreous seal.

The structure was tested in an initial leak test then subjected to a series of thermal shocks as specified by the MIL-SPECS 883, Method 1014, condition C which requires 15 cycles from 150° C. to −65° C. When so tested the structure indicated a constant hermeticity level of less than $1 \times 10^{-8}$ cc/sec He thus demonstrating the unusually strong nature of the sealing glass of this invention.

EXAMPLE 4

Glass L of Table 3 was ground into a fine powder and blended with 75% by weight silver metal powder. About 10% by weight butyl carbitol acetate solvent was then added to the powder mixture to form a die attach paste. After roll milling of the paste to produce a well dispersed suspension, a small quantity of the silver-glass paste was deposited on a ceramic surface. A silicon semiconductor chip was then imbedded into the paste. After controlled drying the structure was slowly heated to about 300° C. to produce a strong bond between the silicon chip and its substrate.

EXAMPLE 5

Glass L of Table 3 was milled together with 20% by weight niobium pentoxide powder. Twenty-five grams of this blend was then mixed with 75 grams of silver powder. When processed in the same way as in Example 4 a very strong bond to a copper alloy, sapphire, or glass substrate was produced.

EXAMPLE 6

A glass similar in composition to Example 1 was prepared by replacing the zinc oxide with barium oxide. A good stable glass was obtained which, however, did not possess the fluidity of the glass of Example 1. A similar glass was prepared using strontium oxide instead of zinc oxide with essentially similar results. It can be seen from these examples that both strontium and barium oxide may replace zinc oxide, but that zinc oxide remains the preferred additive.

EXAMPLE 7

Other sealing glasses within the scope of the invention were prepared and are reported in table 4. The glasses designated T, U, and V have increased replacement of lead oxide with cesium oxide and, thus, increased fluidity.

TABLE 4

| Component | (Examples in weight percent) | | | | | | | |
|---|---|---|---|---|---|---|---|---|
| | O | P | Q | R | S | T | U | V |
| PbO | 43.5 | 43.5 | 40 | 40 | 40 | 35 | 25 | 15 |
| $V_2O_5$ | 43.5 | 43.5 | 40 | 43 | 43 | 40 | 40 | 40 |
| $Bi_2O_3$ | 5.2 | 5.2 | 6 | 4 | 4 | 6 | 6 | 6 |
| ZnO | — | — | 7 | 4 | 4 | 7 | 7 | 7 |
| $P_2O_5$ | 3.6 | 3.6 | 5 | 3 | 3 | 5 | 5 | 5 |
| BaO | 4.2 | — | — | — | — | — | — | — |
| SrO | — | 4.2 | — | — | — | — | — | — |
| $Nb_2O_5$ | — | — | 1 | 2 | 2 | 2 | 2 | 2 |
| Cesium oxide | | | | | | 5 | 15 | 25 |
| $Ag_2O$ | | | | 1 | | | | |
| $WO_3$ | | | | | 4 | | | |
| $MoO_3$ | | | | | 4 | | | |
| DTA Soft. Pt (°C.) | 245 | 242 | 220 | 225 | 225 | 205 | 200 | 185 |
| Linear thermal | 115 | 115 | 112 | 100 | 100 | 125 | 135 | 145 |

TABLE 4-continued

| | (Examples in weight percent) | | | | | | | |
|---|---|---|---|---|---|---|---|---|
| Component | O | P | Q | R | S | T | U | V |
| expansion* | | | | | | | | |

*$10^{-7}/°C$.

EXAMPLE 8

A base glass was prepared by mixing:
250 grams lead oxide
250 grams vanadium oxide
24 grams zinc oxide
30 grams bismuth trioxide
10 grams tantalum pentoxide After heating the mixture in a ceramic crucible at 700° C. for 20 minutes the resulting molten solution was poured through cold steel rollers to facilitate subsequent crushing. The glassy flakes are characterized by a linear thermal expansion of $106 \times 10^{-7}/°C$. (25°–200° C.) and a DTA softening point of 225° C. The resulting glass flakes have a composition in weight percent as follows:
PbO: 44.3%
$V_2O_5$: 44.3%
ZnO: 4.3%
$Bi_2O_3$: 5.3%
$Ta_2O_5$: 1.8%

The glass flakes were ball milled with the addition of 32% by weight (based on the mixture) of niobium pentoxide, also known as columbium pentoxide, powder for a few hours.

The glass/niobium oxide powder blend was tested by melting a small amount of the powder mix on sapphire (single crystal alumina) at about 300° C. for a few seconds. Examination of the resulting glass one hour after cooling showed no evidence of glass lifting, nor any interference colors developed at the glass/sapphire interface indicating the sealing glass mixture of this invention to be a perfect fit to the thermal expansion of alumina ceramic.

Close examination of the surface of the melting glass/niobium oxide powder filler mixture indicated the unusual and rapid wetting tendency of the niobium oxide powder by the melting glass, a characteristic not readily achieved with the traditional silicate and titanate powders thus greatly facilitating the preglazing process of semiconductor ceramic parts.

The sealing glass mix was formed into a paste by adding about 10% by weight butyl carbitol solvent. The resulting paste was screen printed with a masked stainless steel screen on alumina parts. The parts were thoroughly dried and heated on a heater block at about 290° C. to melt and bond the sealing glass pattern to the ceramic surface. The thickness of the fused glass pattern was on the order of 200 to 250 microns.

The glazed alumina parts were inverted and held in position by the pressure exerted by a metal clip to a conventional microelectronic base. The structure was heated at a rate of 75°–100° C. per minute to a peak of about 330° C. for 5 minutes, then cooled to room temperature to produce a tight, strong vitreous seal.

The structure was tested with an initial leak test then subjected to a series of thermal shocks as specified by the MIL-SPECS 883, Method 1014, condition C which requires 15 cycles from 150° C. to −65° C. When so tested, the structure showed a constant hermeticity level of less than $1 \times 10^{-8}$ cc/sec He.

EXAMPLE 9

The base glass of Example 8 is blended with 30% by weight $PbO.Nb_2O_5$ powder sintered with 1% $TiO_2$ at 1150° C. This lead niobate material has a negative thermal expansion between 25° C. to 500° C. The resulting glass/filler mixture is applied to alumina ceramic parts with similar strength and hermeticity results as in Example 8.

EXAMPLE 10

The base glass of Example 8 is blended with 35% zirconium phosphate ($ZrO_2.P_2O_5$) which has a linear thermal expansion of $5 \times 10^{-7}/°C$. The resulting glass/filler mixture is applied to alumina ceramic parts with similar strength and hermeticity results as in Example 8.

EXAMPLE 11

The base glass of Example 8 is mixed with 40% to 50% by weight lead titanate ($PbO.TiO_2$) which has a linear expansion equal to $-60 \times 10^{-7}$ °C. sintered at 600° to 800° C. with 10% by weight $V_2O_5$ (expansion=$6.3 \times 10^{-7}/°C$.), $As_2O_5$ and $Sb_2O_5$, respectively. These three powders were tested according to Example 6. These three powders were readily wetted by the glass and substantially lowered the thermal expansion of the parent glass.

EXAMPLE 12

Example 8 was repeated except that 45% by weight $Ta_2O_5$ powder (expansion coefficient=$20 \times 10^{-7}/°C$.) was added to the glass rather than $Nb_2O_5$. Strength and hermeticity were similar to that obtained in Example 8.

The following Examples 13–17 show the suitability of niobium pentoxide, tantalum oxide and other refractory filler powders derived from Group V elements with solder glasses other than those of the invention.

EXAMPLE 13

A series of lead borate and lead borosilicate glasses (Table 5 below) were prepared in a conventional manner by melting the batch components at 900° C. for 30 minutes in a platinum crucible, except for glass E which required a higher temperature (1100° C.). The melts were poured through stainless steel rollers to produce glass flakes which were then ball milled and screened through a 150 mesh screen.

TABLE 5

| | (Examples in weight percent) | | | | | |
|---|---|---|---|---|---|---|
| | A | B | C | D | E | F |
| PbO | 86 | 85 | 73 | 84 | 75 | 82 |
| $PbF_2$ | — | — | 10 | — | — | — |
| $B_2O_3$ | 12 | 13 | 12 | 12 | 15 | 12 |
| $SiO_2$ | — | 1 | 1 | 1 | 5 | 3 |
| $Al_2O_3$ | — | 1 | — | 1 | 5 | — |
| ZnO | 2 | — | 4 | 2 | — | 3 |
| DTA soft. Pt | 320 | 330 | 300 | 320 | 380 | 340° C. |

The resulting glass powders A to F were mixed with niobium pentoxide powder, 325 mesh, having an alpha radiation level below 0.1 count/cm²/hour. The weight percentages of glass and niobium oxide powders are indicated in Table 6 below. Sealing glass rod samples were prepared for thermal expansion measurements (data also listed in Table 6). It can be readily seen that the thermal expansion of each parent glass can be modified to match alumina, or any other substrate in the 50 to $120 \times 10^{-7}/°C$. range with controlled addition of niobium oxide.

TABLE 6

| | (Examples in weight percent) | | | | | | |
|---|---|---|---|---|---|---|---|
| | 1 | 2 | 3 | 4 | 5 | 6 | 7 |
| Glass A | 70 | | | | | | 65 |
| Glass B | | 75 | | | | | |
| Glass C | | | 70 | | | | |
| Glass D | | | | 80 | | | |
| Glass E | | | | | 90 | | |
| Glass F | | | | | | 80 | |
| Nb$_2$O$_5$ | 30 | 25 | 30 | 20 | 10 | 20 | 35 |
| Thermal Expansion $\times 10^{-7}/°C$. | 62 | 72 | 70 | 82 | 70 | 70 | 56 |
| Sealing temperature | 450 | 430 | 430 | 420 | 500 | 430 | 460° C. |

Alumina ceramic packages were sealed with sealing glass compositions 2, 3, 5 and 6 of Table 6 and subjected to 15 cycles of thermal shock from 150° C. to −65° C. to 150° C. without losing hermeticity.

EXAMPLE 14

Lead borosilicate glass powder B (Table 5) was blended with increasing amounts of niobium pentoxide powder. The resulting glass/filler mixtures were pressed into cylinders and sintered. The resulting linear thermal expansions were measured with the result that the expansion decreased nearly linearly from $110 \times 10^{-7}/°C$. for the pure glass to $56 \times 10^{-7}/°C$. for a mix containing 46% by weight niobium oxide.

EXAMPLE 15

Lead borosilicate glass powder B (Table 5) was blended with 20% by weight Al$_2$O$_3$.Nb$_2$O$_5$ and the complex oxides listed in Table 1 and sintered as in example 14. The linear thermal expansion was decreased as a function of the specific thermal expansion of each respective filler.

EXAMPLE 16

A series of zinc borate and lead-zinc borosilicate glasses were prepared at 1100° C., as in Example 13, to produce glass flakes (Table 7 below).

TABLE 7

| | G | H | I | J | K |
|---|---|---|---|---|---|
| ZnO | 50 | 45 | 45 | 35 | 30 |
| B$_2$O$_3$ | 50 | 45 | 35 | 35 | 30 |
| PbO | — | — | 20 | 15 | 30 |
| SiO$_2$ | — | 10 | 10 | 10 | 5 |
| Al$_2$O$_3$ | — | — | — | 5 | 5 |
| Linear thermal expansion $\times 10^{-7}/°C$. | 52 | 50 | 55 | 48 | 56 |
| Soft. pt °C. | 610 | 650 | 620 | 630 | 620 |

These flakes were finely ground in a high purity alumina ball mill with isopropyl alcohol to produce a powder suspension with a particle size below 5 microns. Niobium pentoxide (20% by weight) was added to each glass suspension and the resulting slurry applied to the surface of silicon wafers with a doctor blade, dried and fired at 750°–800° C. in a diffusion tube furnace. The resulting 25 to 50 micron thick glass films matched the thermal expansion of the silicon wafers. These films are extremely useful for silicon device surface passivation and for dielectric isolation of high voltage silicon power devices.

EXAMPLE 17

Example 16 was repeated using 25% by weight tantalum pentoxide powder instead of niobium pentoxide. Similar results were obtained. Tantalum pentoxide lowers the dielectric constant of the glass composition applied on the silicon surface.

Modifications of the above described modes of carrying out the invention that are obvious to those in the fields of glass manufacture, semiconductor or other electronic part packaging, and related fields are intended to be within the scope of the following claims.

We claim:

1. A low melting glass composition comprising in weight percent calculated on an oxide basis:
    (a) PbO: 30% to 55%,
    (b) V$_2$O$_5$: 30% to 55%,
    (c) Bi$_2$O$_3$: 0.1% to 18%,
    (d) P$_2$O$_5$, Nb$_2$O$_5$, Ta$_2$O$_5$ or combinations thereof: 0.1% to 10%,
    (e) ZnO, BaO, SrO, or combinations thereof: 0.1% to 10%
wherein the combined weight percent of (c)+(d)+(e) is in the range of 0.3% and 20%, and with the proviso that (a) may be replaced partially up to 25% by weight with cesium oxide.

2. The low melting glass of claim 1 wherein the composition includes at least one additive selected from the group consisting of:
    up to 3% by weight Cu$_2$O
    up to 3% by weight Ag$_2$O
    up to 3% by weight F
    up to 5% by weight MoO$_3$
    up to 5% by weight WO$_3$.

3. A low melting glass composition comprising in weight percent calculated on an oxide basis
    (a) PbO: 35% to 45%
    (b) V$_2$O$_5$: 35% to 45%
    (c) Bi$_2$O$_3$: 3% to 8%
    (d) ZnO: 2% to 7%
    (e) P$_2$O$_5$: 0% to 5%
    (f) Nb$_2$O$_5$: 0% to 5%
    (g) Ta$_2$O$_5$: 0% to 8%
wherein the combined weight percent of (e)+(f)+(g) is in the range of 0.1 to 10%.

4. The glass of claim 1 mixed with about 1% to about 50% by weight, based on the mixture, of a low thermal expansion ceramic particulate filler that is compatible with the glass.

5. The glass of claim 4 wherein the filler is a Group V metal oxide.

6. The glass of claim 5 wherein the filler is a niobium-containing oxide, zirconium phosphate, or tantalum oxide.

7. The glass of claim 5 wherein the filler is niobium pentoxide.

8. The glass of claim 2 mixed with about 1% to about 50% by weight, based on the mixture, of a low thermal expansion ceramic particulate filler that is compatible with the glass.

9. The glass of claim 8 wherein the filler is a Group V metal oxide.

10. The glass of claim 9 wherein the filler is a niobium-containing oxide, zirconium phosphate, or tantalum oxide.

11. The glass of claim 9 wherein the filler is niobium pentoxide.

12. The glass of claim 3 mixed with about 1% to about 50% by weight, based on the mixture, of a low thermal expansion ceramic particulate filler that is compatible with the glass.

13. The glass of claim 12 wherein the filler is a Group V metal oxide.

14. The glass of claim 13 wherein the filler is a niobium-containing oxide, zirconium phosphate, aluminum phosphate, or tantalum oxide.

15. The glass of claim 13 wherein the filler is niobium pentoxide.

16. The glass of claim 1 mixed with up to 90% by weight, based on the mixture, of silver or gold powder.

17. The glass of claim 2 mixed with up to 90% by weight, based on the mixture, of silver or gold powder.

18. The glass of claim 3 mixed with up to 90% by weight, based on the mixture, of silver or gold powder.

19. The glass of claim 4 mixed with up to 90% by weight, based on the mixture, of silver or gold powder.

20. The glass of claim 5 mixed with up to 90% by weight, based on the mixture, of silver or gold powder.

21. The glass of claim 6 mixed with up to 90% by weight, based on the mixture, of silver or gold powder.

22. The glass of claim 7 mixed with up to 90% by weight, based on the mixture, of silver or gold powder.

23. The glass of claim 8 mixed with up to 90% by weight, based on the mixture, of silver or gold powder.

24. The glass of claim 9 mixed with up to 90% by weight, based on the mixture, of silver or gold powder.

25. The glass of claim 10 mixed with up to 90% by weight, based on the mixture, of silver or gold powder.

26. The glass of claim 11 mixed with up to 90% by weight, based on the mixture, of silver or gold powder.

27. The glass of claim 12 mixed with up to 90% by weight, based on the mixture, of silver or gold powder.

28. The glass of claim 13 mixed with up to 90% by weight, based on the mixture, of silver or gold powder.

29. The glass of claim 14 mixed with up to 90% by weight, based on the mixture, of silver or gold powder.

30. The glass of claim 15 mixed with up to 90% by weight, based on the mixture, of silver or gold powder.

31. An article of manufacture for use in sealing an electronic part comprising a metal, glass, or ceramic body coated with a pattern of the glass composition of claim 1.

32. An article of manufacture for use in sealing an electronic part comprising a metal, glass, or ceramic body coated with a pattern of the glass composition of claim 2.

33. An article of manufacture for use in sealing an electronic part comprising a metal, glass, or ceramic body coated with a pattern of the glass composition of claim 3.

34. An article of manufacture for use in sealing an electronic part comprising a metal, glass, or ceramic body coated with a pattern of the glass composition of claim 4.

35. An article of manufacture for use in sealing an electronic part comprising a metal, glass, or ceramic body coated with a pattern of the glass composition of claim 5.

36. An article of manufacture for use in sealing an electronic part comprising a metal, glass, or ceramic body coated with a pattern of the glass composition of claim 6.

37. An article of manufacture for use in sealing an electronic part comprising a metal, glass, or ceramic body coated with a pattern of the glass composition of claim 7.

38. An article of manufacture for use in sealing an electronic part comprising a metal, glass, or ceramic body coated with a pattern of the glass composition of claim 8.

39. An article of manufacture for use in sealing an electronic part comprising a metal, glass, or ceramic body coated with a pattern of the glass composition of claim 9.

40. An article of manufacture for use in sealing an electronic part comprising a metal, glass, or ceramic body coated with a pattern of the glass composition of claim 10.

41. An article of manufacture for use in sealing an electronic part comprising a metal, glass, or ceramic body coated with a pattern of the glass composition of claim 11.

42. An article of manufacture for use in sealing an electronic part comprising a metal, glass, or ceramic body coated with a pattern of the glass composition of claim 12.

43. An article of manufacture for use in sealing an electronic part comprising a metal, glass, or ceramic body coated with a pattern of the glass composition of claim 13.

44. An article of manufacture for use in sealing an electronic part comprising a metal, glass, or ceramic body coated with a pattern of the glass composition of claim 14.

45. An article of manufacture for use in sealing an electronic part comprising a metal, glass, or ceramic body coated with a pattern of the glass composition of claim 15.

46. A low melting glass composition consisting essentially of in weight percent calculated on an oxide basis:
(a) PbO: 30% to 55%,
(b) $V_2O_5$: 30% to 55%,
(c) $Bi_2O_3$: 0.1% to 18%,
(d) $Nb_2O_5$, $Ta_2O_5$ or combinations thereof: 0.1% to 10%
(e) ZnO, BaO, SrO, or combinations thereof: 0.1% to 10% wherein the combined weight percent of (c)+(d)+(e) is in the range of 0.3% and 20%, and with the proviso that (a) may be replaced partially up to 25% by weight with cesium oxide.

* * * * *